United States Patent Office 3,565,591
Patented Feb. 23, 1971

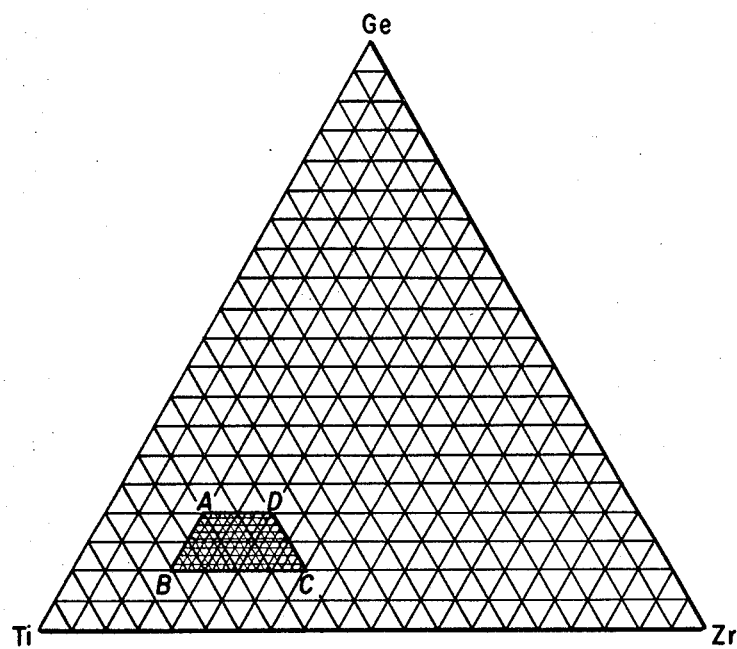
INVENTORS.
Domenic A. Canonico
Nancy C. Cole
Clarence W. Houck
ATTORNEY.

3,565,591
TITANIUM-ZIRCONIUM-GERMANIUM BRAZING ALLOY
Domenic A. Canonico, Oak Ridge, Nancy C. Cole, Knoxville, and Clarence W. Houck, Lake City, Tenn., assignors to the United States of America as represented by the United States Atomic Energy Commission
Filed Mar. 28, 1969, Ser. No. 811,319
Int. Cl. B32b 15/04; C22c 15/00
U.S. Cl. 29—195        2 Claims

ABSTRACT OF THE DISCLOSURE

This invention relates to a new and improved ternary alloy having particular utility in brazing parts made of graphite or a refractory metal selected from the group consisting of titanium, zirconium, hafnium, vanadium, niobium, chromium, tantalum, tungsten, and molybdenum, and alloys containing said metal as a predominant alloying ingredient, said brazing alloy consisting essentially of, by weight, 55 to 75 percent titanium, 15 to 35 percent zirconium, and 10 to 20 percent germanium.

BACKGROUND OF THE INVENTION

The present invention relates to the art of brazing graphite and refractory metals to form brazed joints capable of withstanding temperatures of the order of 1000° C. in a corrosive atmosphere. More particularly, it relates to a brazing alloy for joining graphite and such refractory metals as titanium, zirconium, tantalum, tungsten, and molybdenum, as well as alloys containing these metals as predominant alloying ingredients.

The commercial advent of nuclear power requires structural materials capable of operation at elevated temperatures under corrosive atmospheres and in an intense radioactive field. The use of graphite and the aforementioned refractory metals as materials of construction in reactor components depends, in large measure, on the availability of brazing materials which form brazed composites capable of withstanding the combined effects of high temperature, neutron irradiation, and corrosive atmospheres.

The basic properties required in a braze filler alloy material are a melting temperature of at least 100° C.–150° C. in excess of the intended service temperature of the brazed joint; a capacity to melt and flow freely on the surface of the material to be brazed at or near the melting temperature of the braze alloy where a good wettability is evidenced by the flow of this filler material, not only on the surface of the parts to be joined, but into the capillary of the brazed joint; and the formation of a fillet at the juncture between the two parts to be brazed. The braze alloy is one that preferably freezes over a narrow temperature range in order to avoid varying composition along the length and depth of the freezing brazed joint. The limits of the braze alloy melting point on the low side are determined by the need for the formation of sufficient alloying between the filler alloy and the work-base material to give a bond which is satisfactorily strong under the intended service conditions. The limits of the braze alloy melting point on the high side are determined by the requirement that the braze material must melt at a temperature appreciably below the melting point of the base material in order to avoid deleterious distortion during other parts to be brazed.

In addition to these requirements, a braze alloy must have sufficient strength at design temperatures and must be corrosion resistant. In particular, there should not be any accelerating corrosion caused by the presence of a bi-metallic system, nor should there be any significant corrosion caused by mass transfer effects in such media as liquid metals or in pressurized water systems. Other important considerations are the thermal expansion coefficient, thermal conductivity, volatility of braze components, and chemical reactivity of the braze components, all of which are important variables which govern the selection of a suitable braze filler material joining parts made of graphite and the selected refractory material previously defined.

SUMMARY OF THE INVENTION

It is accordingly the object of this invention to provide an alloy composition especially suitable for brazing graphite to itself and to a refractory metal selected from Groups IV, V and VI wherein said brazing alloy has the combination of properties previously defined and, in addition, has a melting point in the range 1250° C.–1500° C. which produces a brazed joint suitable for service at a temperature in the range 900° C.–1100° C. A brazing alloy which meets these aforementioned requirements is satisfied by a zirconium-titanium-germanium alloy within the range 55–75 weight percent titanium, 15–35 weight percent zirconium, and 10–20 weight percent germanium. The brazing alloys which are useful in forming corrosion-resistant joints for operation at service temperatures of the order of 1000° C. are defined in the area bounded by A–B–C–D of the accompaying figure. Alloys containing more than 20 weight percent germanium have the required lower melting temperature of 1250° C., but have a tendency to form alloy second phases involving intermetallic compounds of germanium, a condition generally regarded as undesirable in forming brazed joints. Alloys containing less than 10 weight percent germanium freeze over an inordinately wide range of temperature, leading to composition variability within the brazed joint. Alloys containing more than 75 weight percent titanium or 35 weight percent zirconium are undesirable because such melts flow slowly and make for poor, unevently filleted, and relatively weak joints.

The brazing alloys of this invention may be made by several well-known metallurgical methods which include arc melting followed by casting into buttons or by standard powder metallurgical techniques to form alloy compacts which are subsequently wrought into sheet form. Even if the selected ternary brazing alloy is not sufficiently ductile for rolling, it is sufficient for brazing purposes to place small fragments of the alloy around the faying surfaces. In some cases, it may even be desirable to use a powder of the required alloy constituents.

In forming a joint between these metals, the clearance between the faying parts is not critical; not only do the alloys flow well through capillary openings, but they also fill larger openings while still providing joints having satisfactory mechanical strength and corrosion resistance. It is not necessary, although it may still be desirable in certain instances, to prepared the surfaces so that they mate with each other exactly.

Prior to brazing, all parts should have clean surfaces. All faying surfaces should be free of oil or grease. One satisfactory cleaning procedure is by vapor degreasing. The brazing alloy is prepared by weighing out required ingredients, preferably in powder or finely divided form, and then arc melting the resulting mixture in vacuum or in an inert atmosphere such as high purity argon. The resultant alloy button or ingot is then either subdivided into small particles finer than 100 mesh size and may be used in this manner. Another method of application involves the use of a carrier which will form a slurry with the alloy powder. The carrier is selected from available organic solvents which are easily volatilized during the brazing cycle without leaving harmful or contaminating deposits.

After cleaning the faying surfaces, the component parts to be joined may be mounted on a brazing fixture or simply placed in an abutting relationship or even separated by a distance of a few millimeters. The filler braze alloy is positioned at the faying surfaces and heated to the required brazing temperature in vacuum or in an inert atmosphere. The heating cycle should preferably be gradual and the heating means designed in such a manner as to maintain uniform and constant temperature. The brazing temperature will depend on the melting point of the particular brazing alloy used, but, in most cases, a temperature of 50–100° above the melting point will be required to permit maximum wetting and free flowability. The optimum time and temperature of brazing will depend on the size and thickness of the parts to be brazed. If held too long at the melting point, excessive base metal alloying will occur; if held for too short a time at the brazing temperature inadequate flow and incomplete filleting is likely to occur. The high brazing temperatures required for forming joints with the alloys of the invention may be achieved by the use of a radiofrequency induction heater apparatus or by use of a resistance heated vacuum metal furnace. The entire brazing operation must be conducted in vacuum or under an inert atmosphere to avoid oxidation of either the braze alloy or the base metal. In certain cases, it may be desirable to preheat the unjoined assembly in order to minimize uneven increases in temperature and to prevent any warpage or distortional effects which may occur as the parts reach the brazing temperature.

Having described the composition of the brazing alloy, together with rational limits which determine its utility for the stated intended purposes, the metals to be joined, and the general procedure by which the brazed composite is formed, the following examples are cited as illustrative and representative embodiments.

EXAMPLE I

Inverted "T" specimens of graphite, 2 inches by ½ inch were brazed using the alloy composition 65 Ti–20 Zr–15 Ge (wt. percent). The brazing alloy was placed at one end of the inverted T specimen and heated to 1450° C. in a vacuum furnace at $10^{-6}$ torr. The brazing alloy was observed to wet and flow over the entire surface of the inverted T specimen. Shear testing of graphite joints made with the braze alloy of the invention invariably resulted in failure in the graphite with no effect in the joint.

EXAMPLE II

Inverted "T" specimens of a molybdenum base alloy containing 0.1 weight percent zirconium, 0.5 weight percent titanium, 0.003 weight percent carbon, and the balance molybdenum were brazed with the braze alloy as described in Example I. The braze alloy was observed to wet and flow freely, forming an excellent filleted joint between the two molybdenum alloy parts.

The invention described herein was made in the course of, or under, a contract with the United States Atomic Energy Commission.

What is claimed is:

1. A brazed composite structure comprising at least two spaced-apart component parts and a connecting piece metallurgically bonded between said component parts, said component parts being selected from the group consisting of graphite and a refractory metal selected from the group consisting of titanium, zirconium, hafnium, vanadium, niobium, chromium, tantalum, tungsten, and molybdenum, said connecting piece, prior to incorporation into said structure, consisting of, in weight percent, 55 to 75 percent titanium, 15 to 35 percent zirconium, and 10 to 20 percent germanium.

2. A new and improved ternary alloy having particular utility in brazing parts made of graphite or a refractory metal selected from the group consisting of titanium, zirconium, hafnium, vanadium, niobium, chromium, tantalum, tungsten, and molybdenum, and alloys containing said metal as a predominant alloying ingredient, said brazing alloy consisting essentially of, by weight, 55 to 75 percent titanium, 15 to 35 percent zirconium, and 10 to 20 percent germanium.

References Cited

UNITED STATES PATENTS

| | | | |
|---|---|---|---|
| 3,038,249 | 6/1962 | Gilliland | 75—175.5X |
| 3,131,059 | 4/1964 | Kaarlela | 75—175.5X |
| 3,220,828 | 11/1965 | Kaarlela | 75—175.5X |
| 3,262,778 | 7/1966 | Kaarlela | 75—175.5X |
| 3,425,116 | 2/1969 | Crooks et al. | 75—175.5 |

CHARLES N. LOVELL, Primary Examiner

U.S. Cl. X.R.

29—472.7, 504; 75—175.5